United States Patent
Swett

[11] Patent Number: 6,004,463
[45] Date of Patent: Dec. 21, 1999

[54] WASTE WATER TREATMENT SYSTEM AND METHOD

[76] Inventor: Thomas R. Swett, 8000 Parker La., Sedro Woolley, Wash. 98284

[21] Appl. No.: 09/041,187

[22] Filed: Mar. 10, 1998

Related U.S. Application Data

[60] Provisional application No. 60/093,937, Mar. 10, 1997.
[51] Int. Cl.$^6$ ........................................... C02F 3/20
[52] U.S. Cl. .......................... 210/614; 210/626; 210/104; 210/134; 210/142; 210/143; 210/195.1; 210/258
[58] Field of Search ........................... 210/614, 616–618, 210/620–629, 102–105, 134, 137, 138–143, 150, 151, 195.1, 201, 202, 205, 218, 220, 258, 532.2

[56] References Cited

U.S. PATENT DOCUMENTS

| | | | |
|---|---|---|---|
| 4,783,750 | 11/1988 | Smith | 210/614 |
| 4,898,672 | 2/1990 | Clifft et al. | 210/614 |
| 5,248,419 | 9/1993 | Long, Jr. et al. | 210/218 |
| 5,314,619 | 5/1994 | Runyon | 210/143 |
| 5,616,240 | 4/1997 | Sonnenreim | 210/104 |
| 5,626,755 | 5/1997 | Keyser et al. | 210/143 |
| 5,647,968 | 7/1997 | Nawathe | 210/614 |

*Primary Examiner*—Thomas G. Wyse
*Attorney, Agent, or Firm*—Hughes & Schacht, P.S.; Robert B. Hughes

[57] ABSTRACT

A waste water system adapted to receive liquid waste from a septic tank or the like and purify the same.

There is a primary processing section comprising a first processing tank to receive the waste water. This primary section has air operated valve means to cause the operating steps, namely the opening and closing of the inlet and outlets of the tank, aeration of the liquid in the tank, supplying a dose of a treatment liquid into the liquid of the tank, and also causing recirculation of some of the biomass in the tank back to the septic tank. The liquid from the first processing section is transmitted to a second processing section where the liquid is circulated through filters, and also through an ultra-violet heater to cause final purification of the liquid. There is a control system which is responsive to liquid level in the two tanks, and also responsive to air pressure in a compressed air manifold that supplies pressurized air to various valves to control the operation of the system.

4 Claims, 7 Drawing Sheets

WASTE WATER TREATMENT SYSTEM AND METHOD

This application claims benefit of Provisional Application Ser. No. 60/093,937 filed Mar. 10, 1997.

BACKGROUND OF THE INVENTION a) Field of the Invention

The present invention relates to a waste water treatment system and method, and more particularly to such a system adapted to treat raw sewage from a home or other source. More particularly, this system can be used in combination with a conventional septic tank to process the effluent from the septic tank so that it need not be discharged into a septic field.

b) Background Art

There are many situations which require on-site sewage treatment, and this is usually accomplished by use of a septic tank and a drainfield. In the septic tank, the raw sewage is subjected to anaerobic treatment, after which the raw sewage is discharged into a septic field where the aerobic action causes further reaction with the sewage material to deactivate the objectionable organisms and/or other material.

There are many situations where the soil is not conducive to the use of drainfields in connection with a septic tank, and this often requires constructing what might be termed as an "artificial septic field". In many situations, because of the limitations of space or for other reasons, creating a drainfield environment artificially is not practical. Thus, there have been various attempts to provide treatment apparatus in which the effluent from the septic tank is subjected to aerobic action by recirculating it through filter media and/or additional treatment.

Yet, there is a continuing need to provide such apparatus which is reliable, has the ability to meet the ever increasingly strict environmental standards, and yet be reasonably economical and "user friendly". Also, there is need to have such a system and apparatus where the susceptibility to malfunction can be minimized.

Accordingly, it is an object of the present invention to provide such a system and apparatus which has a balance of desirable features so that it is able to reliably treat the sewage with efficiency, in terms of ability to deactivate the objectionable organisms and material, and also with the capability of having a desirable balance of operating features.

SUMMARY OF THE INVENTION

The present invention is a system, apparatus and method for waste water treatment, and more particularly for the treatment of waste water which is subjected to treatment in a conventional septic tank, with the effluent of the septic tank being treated in a manner so that the resulting water has a high degree of purification, and does not require a drainfield or other treatment.

This system comprises a processing tank adapted to receive effluent from a waste liquid source, such as a septic tank. There is an inlet means defining an inlet passageway to receive effluent to be treated, comprising an inlet pressurized air operated valve means to block and open the passageway to control the flow of effluent through the passageway.

There is an outlet means defining an outlet air passageway and comprising an outlet pressurized air operated valve means to block and open said outlet passageway to control outflow through the air passageway.

An aerating means is provided, this aerating means having an inlet to receive pressurized air and to discharge the air through air dispensing means in the tank to aerate effluent in the tank.

Also, there is a dosing means arrange to discharge a quantity of dosing liquid into the tank. The dosing means comprises a pressurized air actuated dosing system arranged to discharge a predetermined quantity of dosing liquid in response to an inflow of pressurized air into said dosing means.

A liquid recirculating means is provided. This comprises recirculating tube means positioned in the tank, and an air pump means operatively arranged with the tube means to cause a flow of recirculating fluid through the tube means to the source of waste water.

A control means is provided to control the sequence and operation. This control means comprises a source of pressurized air. There is a valve means comprising a plurality of valves arranged to selectively deliver pressurized air to the system.

This is accomplished to deliver pressurized air to the inlet section and the outlet section, and to selectively vent depressurzied air in said inlet and outlet sections so as to control flow into and out of the tank to selectively stop or permit flow therethrough. Thes pressurized air is also delivered to the aerating means to selectively cause operation of the aerating means. Also, the valve means selectively delivers pressurized air to the dosing means to cause operation of the dosing means. Further, pressurized air is delivered to the recirculating means to cause recirculation of the fluid to the source.

The control system comprises computer means arranged to be responsive to liquid level in the tank, so as to control operation of the valve means to permit an inflow of effluent from the effluent source through the inlet section, while blocking outflow through the outflow section, thus filling the tank to a predetermined depth. Also, the computer means causes the delivery of pressurized air to the aerating means to cause aeration of the effluent in the tank. Further, it directs a quantity of pressurized air into the dosing means to inject a quantity of dosing liquid out of the tank.

Also, the computer causes pressurized air to be delivered to the recirculating means to cause flow of effluent in the tank to the source of effluent.

In the preferred embodiment, the apparatus further comprises a secondary processing section. This comprises a secondary tank adapted to receive fluid from the processing tank. The secondary processing section further comprises a recirculating filter means comprising a pump to circulate fluid in the secondary tank through primary filter means.

The secondary processing section also comprises air valve means having an open position to permit recirculation through the primary filter means, and a closed position to redirect liquid from the pump means to a final filter and purification section which in turn comprises a final filter and a radiation purification device. The secondary processing section further comprises an outlet to discharge fluid from a secondary processing section.

The apparatus further comprises a monitoring system which in turn comprises means to sense liquid level in the processing tank and also in the secondary tank. The monitoring system also comprises pressure transducer means to sense air pressure related to pressurized air delivered to the valve means.

The monitoring means is arranged with the computer means to ascertain operating conditions of the system by monitoring liquid level in the processing tank and the secondary tank along with air pressure in the valve means, and relating this to processing steps occurring in operation of the apparatus to compare pressure and liuqid level conditions expected at certain operating stages with actual liquid level and air pressure as a means of detecting a malfunction.

In the method of the present invention, a system is provided as descibed above. In an idling mode, the outlet means is closed and the inlet means is open to cause effluent to flow through the inlet means into the processing tank. When the processing tank has been filled to a predetermined level, the inlet pressurized air operated valve means is pressurized to block the inlet means, and the batch opeation begins.

The aerating means is operated to cause aeration of the fluid in the processing tank, and the dosing means is also operated to discharge a quantity of dosing liquid into the tank. After this, the liquid recirculating means is operated to cause the recirculation of the fluid.

The control means is operated during this process to monitor the liquid levels in both the processing tank and also the secondary tank. Also, the valve pressures are monitored. The computer compares the liquid levels and the valve pressures with expected liquid levels and valve pressures which would occur during normal operation of the apparatus, and if a deviation of either of the liquid levels and/or valve pressures is indicated, the control means indicates an alarm situation.

In a preferred form, there is a telephone communication link which sends the malfunction signal to a central location. As an optional feature, a return instructions can be transmitted from the monitoring center to the apparatus to shut down the apparatus or cause remedial action to be taken.

Other features of the present invention will become apparent from the following detailed description.

DESCRIPTION OF THE PREFERRED EMBODIMENT

It is believed that a clearer understanding of the present invention will be obtained by first describing generally the overall system and apparatus of the present invention, with this being followed by a somewhat general discussion of the overall operation. After this, each of the sub-systems or components of the present invention will be described in more detail, with this then being followed by a more detailed description of the operation.

a) The Overall System

Figure 1:
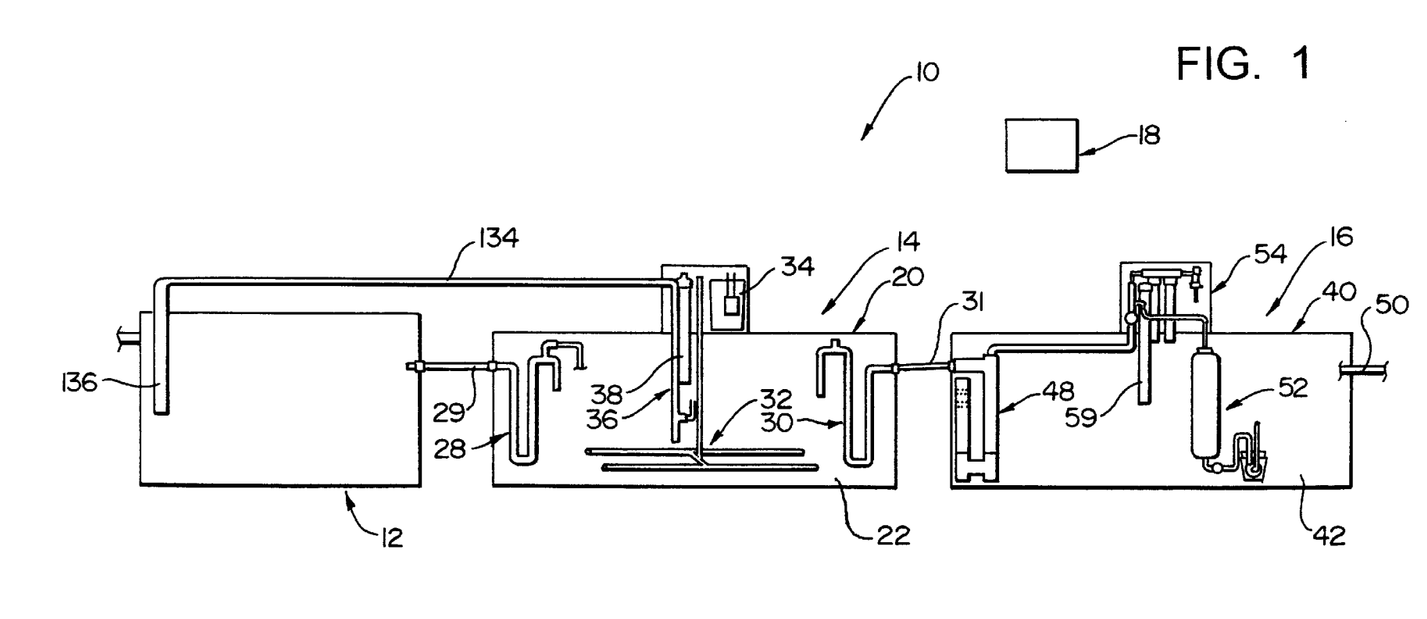
FIG. 1 is a side elevational view, partly in section showing the overall system of the present invention.

FIG. 1 shows the four main components of the system 10 of the present invention. There is a septic tank 12 which is or may be of conventional design, a first processing section 14, a second processing section 16, and a control unit 18 which causes the proper sequence and timing in the operation of the system.

The septic tank 12 receives the raw sewage from a home or other source, and while this raw sewage is in the septic tank 12 it undergoes an anaerobic digesting process. The fluid from the septic tank 12 flows to the first processing section 14 where the fluid is subjected to an aerating process (where small air bubbles are passed through the fluid, a dosing process (where a coagulant and/or other treatment ingredient(s) is or are added), and a partial recycling operation (where a relatively small amount of the bio-mass in the first processing section 14 is passed back into the septic tank 12). After this treatment is completed, then the liquid is passed into the second processing section 16 where the liquid is passed through a primary filter in a recirculating manner, after which the liquid is passed through a fine filter and then through an ultra-violet heating (radiating) device to further purify the liquid. After this the liquid is discharged as a purified liquid to be dispersed into an area in the ground or to some other location.

During this time, the control unit 18 responses to the various sensing elements in the system, and then causes the operation of the various components of the system in the proper sequence and with the appropriate operating time intervals.

Figure 2:
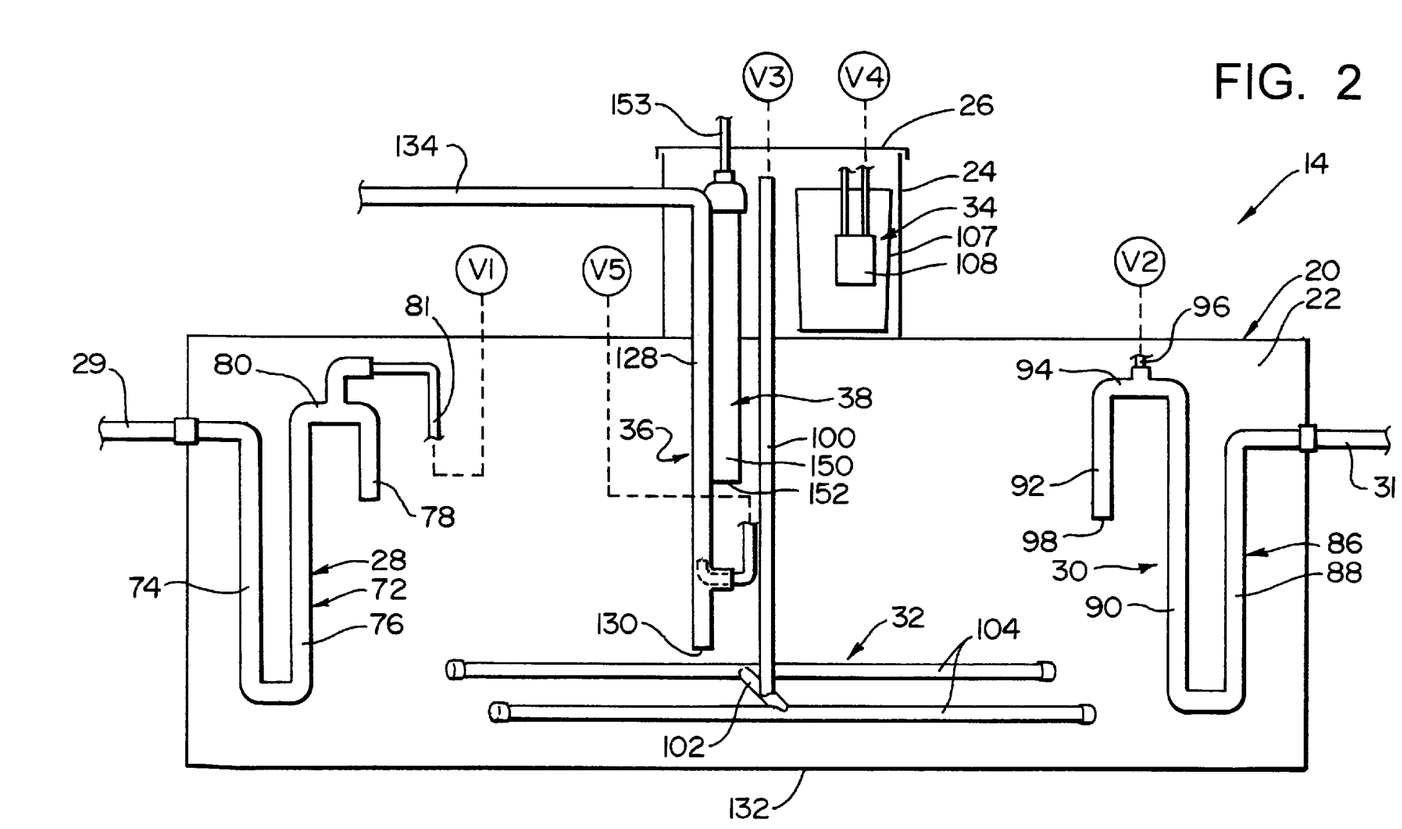
FIG. 2 is a longitudinal sectional view showing the first processing section.

The first processing section 14 is shown in more detail in FIG. 2. This comprises a main tank 20 having therein a processing chamber 22. There is an upper access housing 24 positioned on top of the tank 20, and this contains hoses and other components, and is closed by removable cover 26. The tank 20 would normally be buried in the ground, and the cover 26 would be just at or above the ground level.

This first section 14 has an inlet section 28 which receives the effluent from the septic tank 12 through an inlet pipe 29 extending from the septic tank 12 and leading through an upper end wall portion of the tank 20. There is an outlet tube section 30 positioned at an end of the tank opposite the end where the inlet section 28 is located, and this outlet tube section 30 (as its name implies) discharges the effluent from the tank 20 after the fluid has been subjected to the processing steps in the tank 20, so that the fluid passes through a pipe 31 leading to the second processing section 16. An aerating unit 32 is positioned within the tank chamber 22 to discharge small air bubbles upwardly through the fluid in the chamber 22 to cause the aeration of the fluid. Also, a dosing unit 34 is located in the access housing 24, and this unit 34 injects a small amount of a treating composition, such as a coagulant, into the chamber 22. In the preferred embodiment of the present invention, this is accomplished during the latter part of the aerating period.

This first section 14 also comprises a recirculating mechanism 36. When the treatment cycle of a batch of fluid has been completed in the chamber 32, and there has been a settling period where much of the bio-mass has settled in the bottom of the tank, this recirculating mechanism recycles a certain amount of the fluid and the bio-mass back to the septic tank 12, where the bio-mass, added to the contents of the septic tank 12, can facilitate the processing of the raw sewage in the septic tank 12.

Finally, there is a liquid level sensing device 38 positioned partially within the tank 20. This sensing device is, in this preferred embodiment a pressure sensitive device responding to the level of the liquid in the tank 22 so that this information can be transmitted to the control unit 18.

Figure 3:
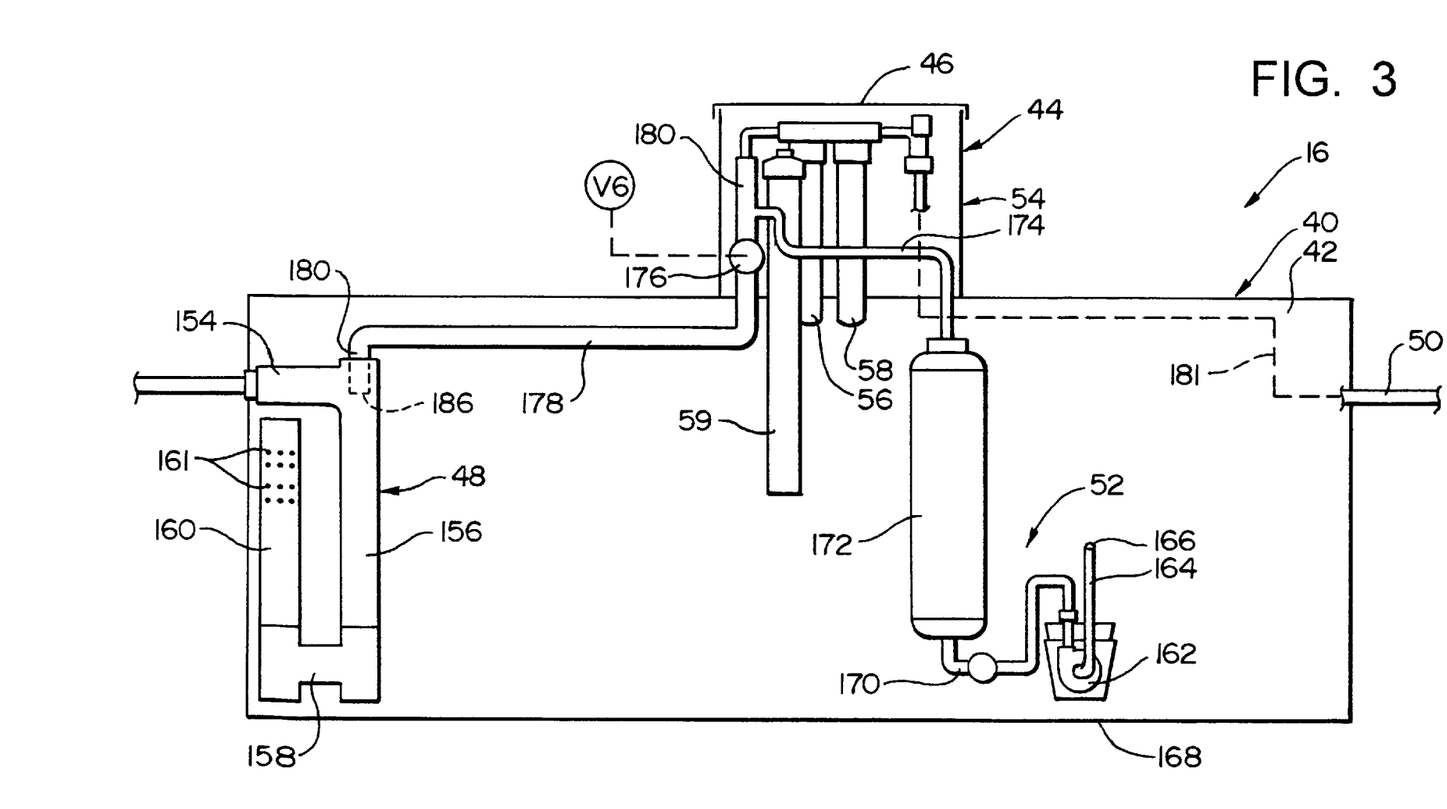
FIG. 3 is a view similar to FIG. 2, showing the second processing section.

The second processing unit 16 comprises a tank 40 having a processing chamber 42. Positioned above the tank 40 is an access housing 44 having a removable top cover 46. There is positioned in the chamber 42 an inlet section 48, and an outlet tube 50 positioned on a side of the tank opposite the end where the inlet section 48 is located. Also positioned within the tank is a recirculating primary filter system 52, and a final filter and purification section 54. This section 54 comprises a fine filter component 56 and an ultra-violet heater 58 to accomplish final purification. Also there is a liquid level sensing device 59.

In operation, this second processing unit 16 receives the processed effluent from the first processing section 14 and directs this effluent into the chamber 42 in a flow controlled manner so as to create little disturbance within the chamber 42. The recirculating filter system 52 is in continuous operation (i.e. it is never inactivated), and it operates in two modes. In its recirculating mode it, it recirculates the effluent in the chamber 42 in a continuous manner. Then at the end of a recirculating cycle, a valve is operated to direct the output from the recirculating system through the final filter and purifying system 54. The fluid passing from this system 54 is then discharged through the outlet pipe 50.

Figure 4:
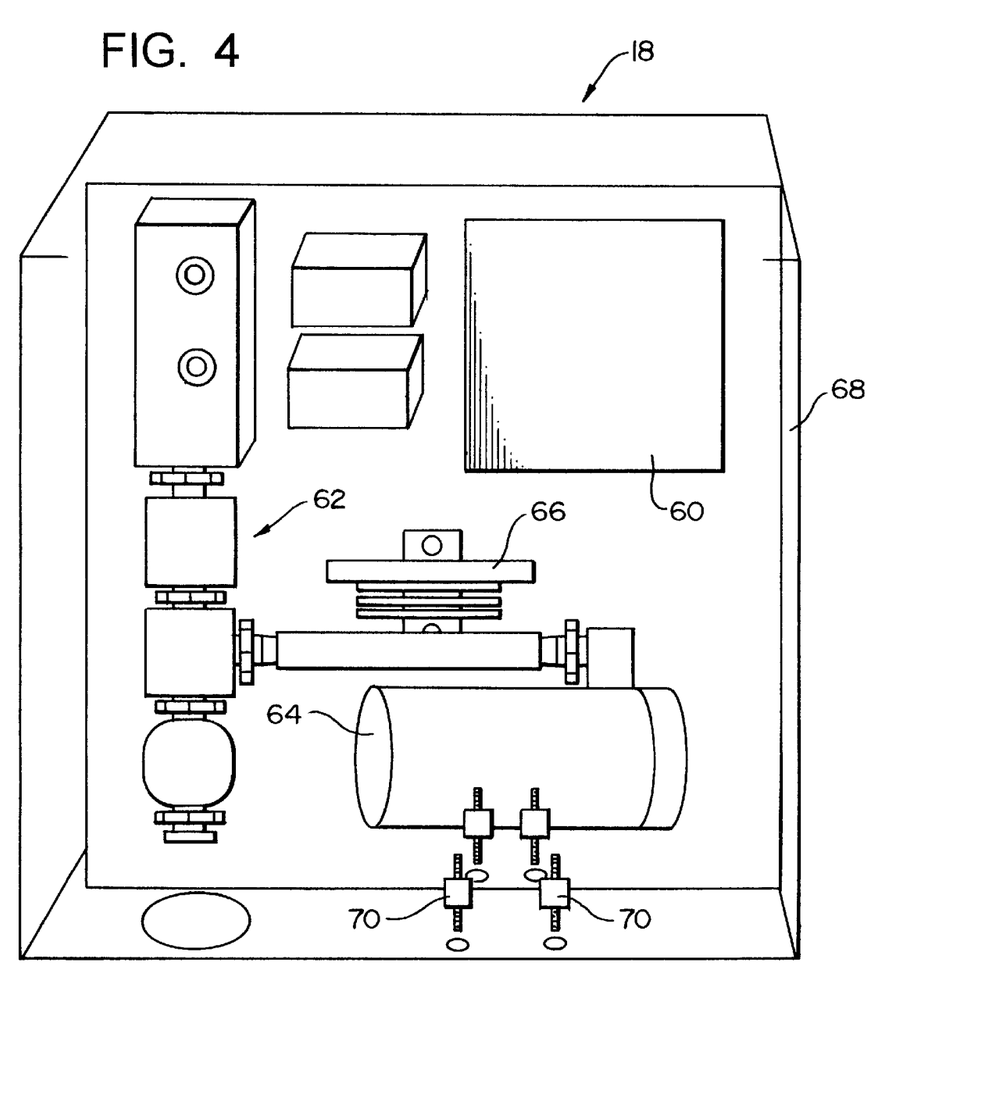
FIG. 4 is a perspective view illustrating the main components of the control section.

The control unit 18 is shown in FIG. 4, and can be seen to comprise a computer 60, a valve section 62, an air compressor 64, and a circuit breaker 66. These components are positioned in a housing 68 mounted in a suitable manner (e.g. by shock mounts 70) to isolate the vibrations generated in the control unit 60.

The control unit 18 also comprises six separate air valves which are positioned in the valve section 62. These six air valves V1–V6 are shown schematically in FIGS. 2 and 3. The control unit 18 operates the entire system 10 by opening and closing these air valves V1–V6 in proper timed relationship. Five of these air valves V1–V5 are operably connected through air hoses to the first processing section 14, and the sixth valve V6 is connected to the second processing unit 16.

There will now be a more detailed discussion of the main components of the system 10.

b) The First Processing Section 14

Reference is made to FIG. 2. As indicated previously, this first processing unit 14 has an inlet tube section 28, an outlet tube section 30, an aerating unit 32, a dosing unit 34, a recirculating system 36, and a level sensing device 38.

The inlet tube section 28 comprises an S-shaped tube inlet portion 72 that comprises a first vertically aligned tube portion 74 having an upper end which receives the inflow from the aforementioned inlet section 29 that in turn is connected to the septic tank 12. There is an intermediate valve tube section 76, the lower end of which connects to the lower end of the tube 74, and this tube section 76 directs fluid received from the tube section 74 upwardly. The third tube section 78 has an upper end connected to the upper end of the intermediate tube section 76, and this upper connection is designated 80.

It can be seen that the first air valve V1 (shown only schematically in FIG. 2, is connected through a hose shown schematically at 81 to the upper connecting tube portion 78. This connecting tube portion 78, with the valve V1 functions as an air valve, to either permit flow through the inlet tube section 28 or block the flow. When pressurized air from the compressor 70 in the control unit 18 is directed through the valve of V1 and into the space within the connecting section 80 a pressurized air pocket blocks fluid flow through this connecting section 80. The pressurized air can be injected into this connecting section 80 until it completely fills the third tube portion 78, with any excess air simply bubbling out of the lower end outlet of the tube portion 78. The vertical length of the tube portion 78 is great enough to block any flow from the septic tank 12 through the connecting tube 29, even when the level in the septic tank reaches a level at the top of the septic tank 12. When it is desired to permit further flow through the inlet tube portion 28, the valve V1 is vented to atmospheric pressure, which will permit the flow through the S-shaped tube portion 72 and into the tank chamber 22.

The outlet tube section 30 also has an S-shaped tube portion 86, comprising three tube portions 88, 90 and 92, with the tube portions 90 and 92 having an upper connecting tube portion 94. The upper connecting tube portion 94 is connected through a hose 96 to the second valve V2. Thus, flow outwardly through the outlet tube section 30 can be blocked by opening the valve V2 to deliver pressurized air into the tube connecting section 94. Then by venting the valve V2 to atmosphere, the flow through the S-shaped tube section 86 is permitted. It will be readily recognized that when the valve V2 is vented to atmosphere, the S-shaped tube section 86 is able to operate in the manner of a siphon to draw water out of the chamber 22 until the water level reaches the level of the lower end 98 of the inlet tube portion 92 of the S-shaped tube portion 86.

The aerating unit 32 will now be described with further reference to FIG. 2, and also to FIG. 5. There is a vertical air inlet tube 100 that is connected at its upper end to the valve V3. This inlet tube 100 extends downwardly to a cross tube 102, which in turn connects at its end portion to two laterally spaced air outlet tubes 104. These tubes 104 are each formed with a plurality of small orifices so that when pressurized air is directed downwardly through the inlet tube 100 and into the tubes 104, many small bubbles pass outwardly into the fluid within the chamber 22. (In FIG. 5, this aerating unit 32 is shown somewhat schematically and it should be recognized that the inlet tube 100 would be vertically aligned, and the two air discharge tubes 104 would be horizontally aligned.

Figures 5, 6:
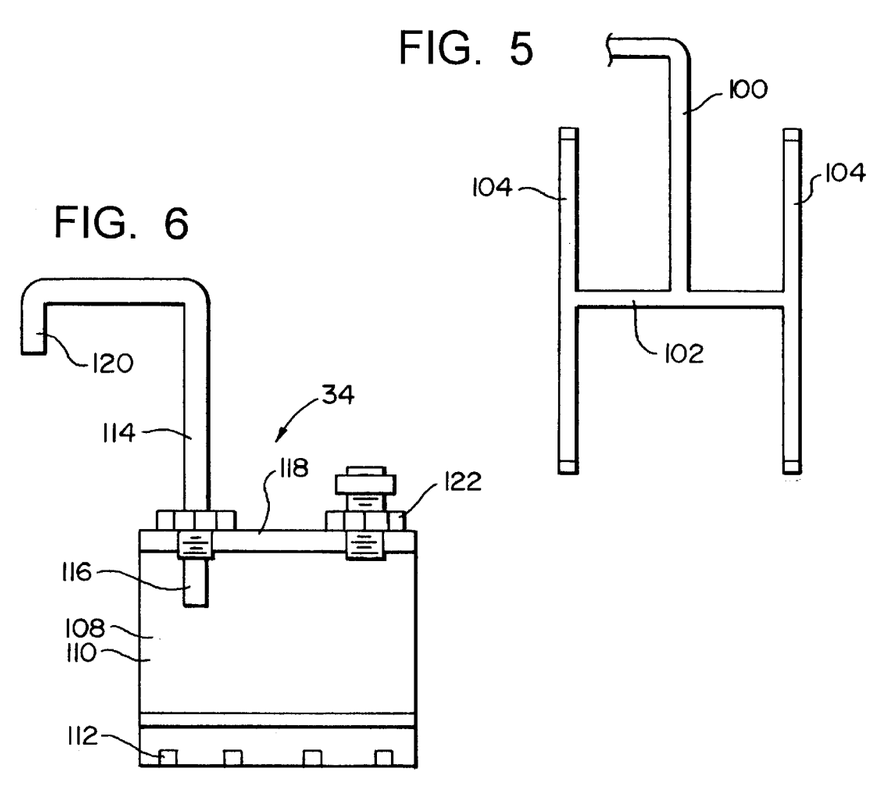
FIG. 5 shows the aerating section apart from the apparatus.
FIG. 6 is a sectional view showing the dosing vessel and its associated discharge tube, separated from the apparatus.
Figure 7:
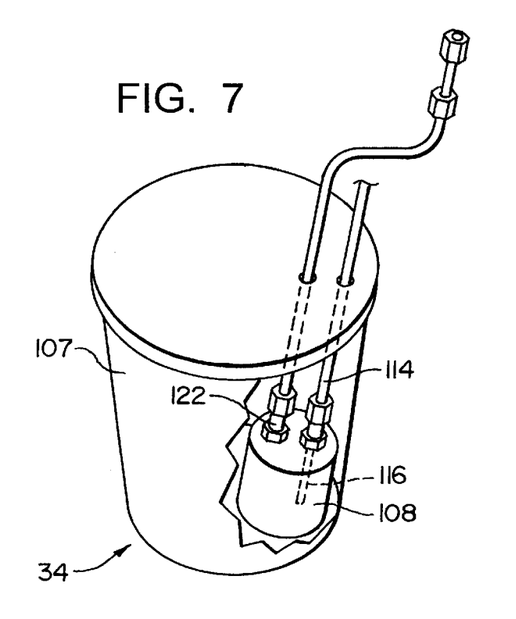
FIG. 7 is an isometric view of the dosing unit.

The dosing unit 34 is shown in FIG. 2 as being located in the upper housing portion 24, and is shown in more detail in FIGS. 6 and 7. This dosing unit 34 comprises a container 106 (not shown in FIG. 6) which holds the liquid treating agent to be used. For example, this treating agent could be a coagulant which would tend to cause the various solids in the fluid to agglomerate and thus more quickly descend to the bottom of the tank. Another possibility is that the treating liquid could comprise (or also comprise) oil eating organisms which could be used, for example, when the effluent might be restaurant waste than contains oils.

Positioned at the bottom of the container is a dosing device 108 which comprises a relatively small vessel 110 having a plurality of quite small inlet ports 112. The liquid contained in the larger container 106 will flow through the inlet ports 112 until the vessel 110 is filled.

There is an outlet tube 114 having a lower end 116 which extends a short distance below the upper wall 118 of the small container 108. The outlet tube 114 has an upper discharge end 120 which connects to a tube to deliver the dosing liquid into the chamber 22. There is an air inlet connection 122 that connects to the valve V4. The lower end of the fitting 122 extends only a short distance into the upper end of the upper portion of the small container 108.

To describe the operation of this dosing mechanism, the larger container 106 is filled with a quantity of the dosing liquid, and this dosing liquid would have slowly filled the smaller vessel 108 and also extend up the outlet tube 114 to the level of the dosing liquid in the container 106. At such time as it is desired to inject a small quantity of the dosing liquid into the chamber 22 of the tank 20, the air valve V4 is opened to cause pressurized air to flow through the fitting 122 and into the vessel 110. This will immediately cause the dosing liquid in the vessel 110 to pass upwardly through the inlet end 116 of the tube 114. This will continue until the liquid level in the vessel 110 reaches the lower inlet opening of the tube end 116, so that only air flows into the tube 114. The computer is arranged so that the air valve V4 is opened only for a time somewhat longer than it would normally take to discharge the proper quantity of liquid from the vessel 110. After that period of time, it would be presumed that the proper amount of the dosing liquid has been discharged, so that it would now be appropriate to vent the valve V4 to atmospheric pressure.

With the valve V4 now being vented to atmospheric pressure, then the dosing liquid would slowly flow back through the small orifices 112 to again fill the vessel 110 and also fill the tube 114 up to the level of the liquid in the main container 106.

The recycling system 36 will now be described with reference to FIGS. 1, 2, 8 and 9. The system 36 comprises a pipe having an inside diameter of 2½ inches, which comprises a vertical pipe section 128 having an inlet end 130 that is a short distance above the bottom wall 132 of the tank 20. This pipe section 128 connects at its upper end to a horizontal pipe section 134 which (with reference to FIGS. 1 and 9) extends over the septic tank 12, where it connects to a downwardly extending pipe section 136 that is positioned at an end of the septic tank 12 that is opposite to the location of the outlet pipe 29.

Flow through the pipe section 128 is caused by means of an air ejector pump, shown in FIG. 7. The lower end of the vertical pipe section 128 is formed with a T section 138, with the branch 140 of the T section being connected to an ejector fitting 142. This fitting 142 has an air hose connecting portion 144 that in turn connects to the valve V5. This connector 142 extends into a right angle discharge nozzle 146, having an outlet end that faces upwardly into the interior of the vertical pipe section 128. Thus, when it is desired to recirculate the liquid and material positioned at the lower portion of the tank 20, the valve V5 is opened to cause the pressurized air to flow out through the upwardly directed nozzle 146. This causes an ejector action that causes the liquid in the pipe 128 to flow upwardly in the pipe section 128 and through the pipe sections 134 and 136 to be discharged into the septic tank 12.

Figure 8:
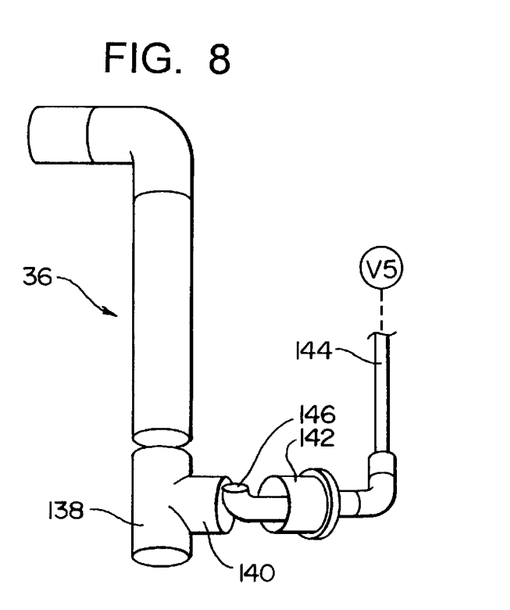
FIG. 8 shows a portion of the recirculating unit of the first processing section, showing several of the components separated from one another.
Figure 9:
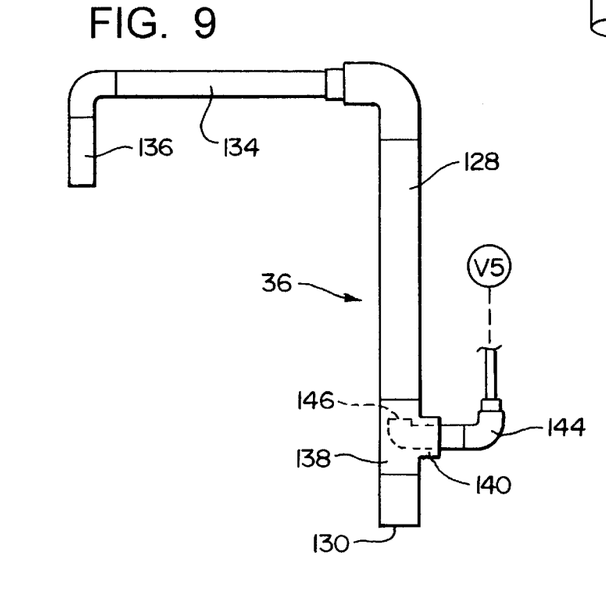
FIG. 9 is a view showing the recirculating system of the first processing section with the parts assembled, and separate from the other apparatus.

The valve V5 is opened for a selected period of time to cause a portion of the bio-mass and collected material in the bottom of the tank 20 to be recirculated back to the septic tank 12. The amount of bio-mass and other solid material that is recirculated is determined by the distance that the inlet end 130 of the vertical pipe section 128 is positioned above the bottom wall 132. Also, the time period during which the valve V5 is opened is controlled so that after a sufficient recirculation of the bio-mass and material has been accomplished, after which the valve V5 will be vented to atmosphere.

The level sensing device 38 comprises a tube 150 having an open lower end 152 positioned at a predetermined level in the tank 20 which would be a short distance above the lower operating limit of the level of liquid in the tank chamber 22. The upper end of this tube 150 is connected to an air hose 153 which in turn connects to the control unit 118, where there is a pressure transducer to read the air pressure. When the liquid level rises, this increases the air pressure in the tube 150 and thus in the hose leading to the pressure transducer in control unit 118. This information is in turn transmitted to the computer 60 where this information is translated to provide a value related to the level of liquid in the tank 20. Since this pressure sensing unit 38 is or may be conventional, a detailed description will not be given in this text.

c) The Second Processing Section 16

Reference is made to FIG. 3. The aforementioned inlet section 48 of the second processing section 16 comprises an inlet tube section 154 extending through the end wall of the tank 40 and this tube section 154 connects into a vertically aligned pipe 156 that has a relatively large diameter. The lower end of this pipe 156 connects through a horizontally aligned tube section 158 to an upwardly extending tube section 160, also having a relatively large diameter. This tube section 160 has a plurality of openings 161 around its circumference to permit the liquid to flow outwardly therethrough. The first function of these tube sections 156, 158 and 160 is to direct the flow from the first processing section 14 into the secondary tank chamber 42 so as to create very little disturbance to the liquid in the chamber 42.

The recirculating filter system 52 comprises an electric pump 162 which is positioned at a lower part of the tank chamber 42. Liquid is directed into the pump 162 through a pipe 164 having an inlet opening 166 that is a moderate distance above the bottom wall 168 of the secondary processing tank 40.

Figure 10:
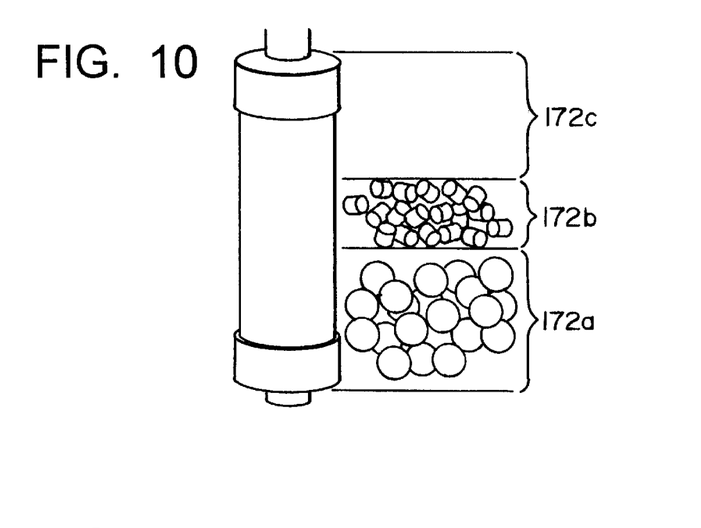
FIG. 10 is a perspective view of the primary filter of the second processing section, and also showing the location of the components thereof.

An outlet tube 170 from the pump 162 leads into a primary filter 172. The liquid passing through the filter 172 is carried from the filter by a tube 174 to a location near the upper part of the access housing 44, and thence through an air actuated valve 176 through another pipe section 178. This pipe section 178 extends to a location above the tube section 156, and the pipe section 178 has a downturned end portion 180 which discharges the fluid through its end opening 188 into the upper part of the tube section 156. The primary filter 172 can comprise various prior art material which are used in fish containing aquariums to filter the water. For example, in the present embodiment, a substantial portion of this filter contains a product sold under the mark "Large Bio-Pin Ball", distributed by Lee's Aquarium Pet Products. As illustrated in FIG. 10, such material is positioned at 172a in the bottom part of the filter 172; elongate filter material (e.g. ceramic noodles) similar in appearance to long strands of noodles is placed at an intermediate location 172b, and a certain amount of rocks or gravel are positioned in the top part of the filter 172c. Over a period of time, a slime-like substance will collect on the surfaces of the filter material contained in the filter unit 172, and these can be removed by back flushing in a common prior art manner.

With the air valve 176 open, the motor 162 continuously pumps liquid in the tank chamber 42 through the filter 172, through the pipe sections 174 and 178 into the pipe section 156. The liquid then flows through the pipe section 156 and into the pipe section 160 to be discharged through the openings 161 in the pipe section 160 back into the chamber 42. This is accomplished at a volumetric flow rate and in the manner so that the recirculation does not cause any significant disturbance in the tank chamber 42.

To describe now the final filter and purifying system 54, as indicated previously, this comprises a final filter 56, and ultra-violet light heater 58. The pipe section 174 leading from the primary filter 174, in addition to connecting through the valve 176 to the pipe section 178, also has a branch connection 180 which extends upwardly to connect to the fine filter 56. This filter 56 is optional, and in some instances may be omitted. This filter 56 is a fifty micron filter and the liquid from the filter 56 then flows through the ultra-violet heater section 58 which deactivates the fecal coliform material, and any other remaining organisms in the fluid. The liquid leaving the ultra-violet heater 58 flows through a tube (indicated by the broken line 181) to the pipe 50 that comprises the outlet 50 of the secondary processing unit 16.

The final filter and purifying system 54 is brought into operation periodically. When it is desired to discharge a portion of the fluid accumulated in the tank chamber 42, this is accomplished by opening the valve V6 which directs pressurized air to the air valve 176 to cause this valve 176 to close. This valve 176 comprises an expandable diaphragm which, when pressurized, expands to close off the passageway of the pipe section 178 from the pipe section 174. Thus, the fluid pumped from the pump 162 flows upwardly through the pipe section 180, and thence through the filter 56 and ultra-violet heater 58 to be discharged outwardly through the tube 50.

d) The Overall Operation of the System

In general, the system 10 operates in two modes, namely an idling mode, and a batch process mode. In the idling mode, the first tank 20 has previously been emptied down to a predetermined lower level, as sensed by the depth sensing device 38, and the inlet tube section 28 in the first processing unit 14 is open so that as raw sewage flows into the septic tank 12 and is at the level of the discharge tube 29, this effluent from the septic tank flows through the inlet tube section 28 and into the primary processing chamber 22. During this time, the valve V1 is open to atmospheric pressure so that there is no pressurized air in the tube section 80 of the S-shaped tube section of the inlet section 28.

At this same time, the outlet tube section 30 has been blocked by reason of the valve V2 having been opened to inject pressurized air into the connecting member 94 of the outlet section 30 to block flow through the outlet tube section 30.

Also, during this idling mode, the second tank 40 had been previously filled to its top operating level during the latter part of the prior batch processing operation. As indicated previously, the pump 162 has been operating continuously, both through the idling mode and in the batch process mode. In the idling mode, the air valve 176 is open, with its related pressurizing valve V6 being vented to atmospheric pressure. Thus, the pump 162 is pumping the fluid in the chamber 42 of the second tank 40 upwardly through the primary filter 172, through the pipe section 174, through the open valve 176, through the pipe section 178 to pass out the outlet 180 and into the tube section 176. Then, as described previously, the liquid passes out the openings 161 in the tube section 160.

Also, during the idling mode, the aerating unit 32 is operating periodically to discharge air bubbles into the fluid of the tank 20 to accomplish aerobic activity in the fluid in the first tank 20. The computer accomplishes this in a four step process. First, the valve V2 is opened to insure that the outlet tube section 30 has blocked flow. Second, the valve V1 is vented to atmospheric to insure that the inlet tube section 28 remains open so that fluid continues to flow into the tank 20 form the septic tank 12.

As a third step, the valve V3 is opened to blow pressurized air through the aerating unit 32, and this aeration continues for about fifteen minutes. Then the fourth step is that the valve V3 is closed to shut off the flow of pressurized air, thus stopping the bubbling action from the aerating unit 32, and the solids in the liquid in the tank 20 settle toward the bottom of the tank. After thirty minutes of setting, the cycle repeats itself. With the valve V1 and V2 being actuated, as indicated above, to insure they are in the correct position, then there is fifteen minutes of the aerating, followed by another thirty minutes of settling.

This idling mode continues until the total flow from the septic tank 12 into the first processing tank 20 has been of sufficient volume (e.g. about 150 gallons) to cause the level in the tank 20 to reach the upper level limit, where the sensing device 38 transmits the signal to the computer 60 to start the batch cycle.

The batch cycle will now be described. When this signal is received, a number of steps occur in sequence, as follows. To initiate the batch process cycle, the valve V2 is opened for a short period of time to blow air into the outlet tube section 30 to insure that it blocks the flow of liquid therethrough. The inlet tube section 28 has been open during the idling cycle (i.e. the valve V1, being opened to atmospheric), and valve V1 to deliver pressurized air into the inlet section 28 to block flow through the inlet section.

The second step is to cause aeration of the liquid in the tank 20, and this is accomplished by opening the aerating valve V3 for a period of time (possibly forty minutes) to cause the aerobic processing action in the liquid. This also creates a turbulence in the liquid to insure intimate mixing of the biomass with the fluid.

After about forty minutes the third step is to again open the inlet and outlet control valves V1 and V2 to pressure to again direct pressurized air into the inlet and outlet sections 28 and 30 to insure that these remain blocked. The fourth step is to again open the aerating valve V3 to cause the air bubbles to flow outwardly through the aerating unit 32, and this can continue for another optimal period of time (e.g. forty minutes).

Near the end of the second aerating step, the next step is to open the air valve V4 to cause pressurized air to flow to the dosing unit 34 and to cause a small amount of dosing liquid to flow from the dosing unit 34 into the liquid in the first tank 20. The injection of the dosing liquid into the liquid in the tank is timed so that the small amount of dosing liquid (e.g. possibly as small as a teaspoon) is introduced into the tank 20 during the last two minutes of aeration, so that the dosing liquid is mixed in with the sewage effluent in the tank 20. This two or more minutes of mixing can be considered a sixth step in the batch process mode.

As a seventh step, the outlet control valve V2 is once again pressurized to blow air into the outlet section 30 to insure that it is blocking flow.

At approximately the same time, as an eighth step, the computer 30 sends a signal to the ultraviolet radiating unit 58 to activate the unit 58 which takes about five minutes to warm up to its operating temperature.

The ninth step occurs about five minutes after the ultraviolet radiation unit is turned on and brought up to operating temperature, and this is to open the valve V6 which closes the air valve 176 in the second tank 42. This causes the flow from the pump 162 to be diverted so that after the flow goes through the primary chamber 52, it is directed upwardly through the line 180 to flow into the final filter 56 and also through the ultra-violet radiating unit 58, with the flow from the ultra-violet radiating unit 58 passing out through the exit tube 50. The shut off valve 176 remains in its closed position for about forty minutes, until the level in the tank, as sensed by the sensing unit 56, has dropped to the desired level.

The tenth step is that the depth sensor 59 sends a signal to the computer 60 that the desired lower level has been reached in the tank 40. Then, as an eleventh step, the valve 176 remains closed for an additional several minutes, as a safety precaution. This causes the level in the tank to drop about a half an inch lower than the level at which the sensor 59 sense the low level limit.

The twelfth step is to open the valve V6 to atmospheric pressure so that the liquid pumped by the pump 62 in the second tank 42 now flows through the valve 176, and through the pipe section 178 to be recirculated by the pump through the primary filter 172. Also, at this time power to the ultra-violet heater 58 is shut off so that a film does not become baked onto the quartz sleeve of the heater 58. As indicated earlier, the pump 162 operates continuously through both the idling mode and the batch process mode.

The thirteenth step is to open the recirculating valve V5 to activate the recirculating system 36 by causing pressurized air to blow outwardly through the nozzle 146 in the recirculating tube 128, with the recirculated liquid being delivered through the outlet 136 back to the main septic tank 12. As indicated previously, this reintroduces some of the bacteria and other portions of thee active bio-mass in the bottom of tank 20 back to the septic tank 12 to enhance the digesting process in the septic tank 12. This recirculating is continued until the liquid level in the first tank 20 has dropped about two inches (as sensed by the depth sensor 38), and at this time the valve V5 is closed to stop the injection of the air into the recirculating pipe 90.

This closing of the valve V5 initiates a settling period (e.g. about ten minutes) which is considered to be the fourteenth step during which the solids in the first tank 20 settle toward the bottom of the tank 20.

The fifteenth step is to vent the valve V2 to atmospheric pressure to permit gravity flow from the tank 20 into the tank 40. In this particular installation, the actual draining period from the tank 20 to the tank 40 to drop the level in the tank 20 to the desired level is about twenty minutes. In the preferred sequence, when the liquid in the tank 20 has reached the level to trigger the low level signal, as a sixteenth step the computer causes the valve V2 to permit flow from the tank 20 for an additional three minutes of so.

At the end of that three minute period, the valve V2 is opened to the pressurized air source to cause pressurized air to flow into the outlet section 30 and block further outlet flow. The next step is to vent the valve V1 to atmospheric so as to permit flow through the inlet section 28 into the tank 20.

At this time, the system 10 now begins its idling mode of operation. During the batch process cycle which has just been completed, a certain amount of the raw sewage from the home or other source may have flowed into the septic tank 12, and with the inlet 28 now being opened to flow (by venting the valve V1) this amount of raw sewage will flow into the first tank 20. Then, as indicated above, the system 10 will remain in its idling mode until such time as the liquid level in the tank 20 has reached the upper limit to start the batch process mode of operation.

It should be noted that in the present system, the benefits of a batch process are achieved, so that the initiation of the various processing steps, and as well as the time period during which a certain processing steps are accomplished, can be controlled for optimized results. Also, since a predetermined amount of the effluent is processed in each processing cycle and for precise times intervals in proper sequence, the effectiveness of the processing can be optimized. Yet, during the "idling time", both the first and second processing sections are in operation to enhance the purifying action. More specifically, during the idling time the aeration in the first processing tank 20 is carried on periodically, and the recirculating filtering process through the primary filter 172 is carried on in the second tank 40.

Another advantage of the present system is that the septic tank 12, the first processing section 14 and the second processing section 16 are substantially free of any moving parts, thus improving reliability. There are only two exceptions to this. First, there is a motor 162, but this operates continuously, and thus requires no switching between on and off modes. Second, there is the inflatable valve 176, so that the only moving part in this valve 176 is an expandable member which is inflated and deflated to close and open up a passageway.

There are only a few components which need replacement or maintenance. One is the filter unit 172 which needs back-flushing periodically (possibly once every six to twelve months). The final filter 56 (which is optional) is or may be a prior art filer which would simply be replaced every six to twelve months. Also, the ultraviolet heater 58 would need to be cleaned and/or replaced every six to twelve months.

Further, the majority of the operating components are controlled by air activated valves which can be powered from a single compressor. This substantially enhances reliability. In the event there is an electrical outage, so that the system becomes inoperative, there is no flow of the sewage through the system. During the idling cycle the inlet section 30 blocks flow since there is compressed air in its S-shaped tube section. This volume of compressed air remains in its blocking location in the inlet section 30, and it would not be vented to atmosphere until such time as the valve V2 is actuated by the computer to its release position, which would mean that power had been restored.

During the batch process mode, the S-shaped tubes of both the inlet and outlet sections 28 and 30 each has a volume of pressurized air blocking the flow of liquid.

Also, during a power outage the motor 162 will not be operating, and the resistance of the final filter 56 is sufficient to block fluid flow.

e) The Monitoring System

The control unit 18 further comprises a monitoring system, and this is described with reference to FIG. 11. As described previously, the control system 18 comprises the computer 60 and also the valve section 62. The valve section 62 comprises an air manifold 190 which receives pressurized air from the compressor 62. The valves V1, V2, V4 and V6 are relatively smaller valves, having smaller airflow requirements, while the valves V3 and V5 are larger valves, having higher airflow requirements. The air manifold 190 is connected through a hose 192 to a pressure transducer 194 at the computer 60. Also, the two previously mentioned pressure transducers are indicated FIG. 11, these being first a pressure transducer 196 communicating with the liquid level sensing device 38, and the other a pressure transducer 198 connecting to the level sensing device 59 that is in the second processing unit 16.

It will be recalled that it was mentioned earlier herein that the computer 60 responds to the various liquid levels in the two tanks 20 and 40 to initiate and/or terminate certain steps in the overall sequence of operation. In addition, the computer 60 has certain timing functions so that it determines the length of the time period during which certain functions are to take place. Thus, at every stage in the operation of the present invention, the computer is aware as to which of the valves V1–V6 are either open to cause pressurized air to flow therethrough, closed so as to block airflow, or vented to atmosphere. Also, the two pressure transducers 196 and 198 constantly take pressure readings from [ressire deve;p[ed at the two level sensing devices 38 and 59 so that the computer 60 is constantly aware of the liquid level in each of the two tanks 20 and 40.

It should also be recognized that when one or more of the valves V1–V6 are open to permit the flow of pressurized air therethrough, this causes a change of pressure in the pressurized air manifold 190. Also, the pressure change will vary in accordance with the airflow created by the valve or valves. For example, the valves V3 and V5 are larger valves requiring greater flow of air (since the valve V3 delivers pressurized air to the aerating unit 32 and the valve V5 delivering air to the recirculating unit 36).

At every stage of the process, if the overall system 10 is functioning reliably, the liquid levels in the two tanks 20 and 40 will each be at a certain level, and the air pressure at the manifold air transducer 194 will also be at a certain level. If there is any deviation from this, then the computer senses a malfunction.

To give an example of this, let us assume that there is a certain point in the cycle where the valve V1 is to be opened to cause pressurized air to flow through the inlet section 28, and at that time there is a lower than usual air pressure sensed by the transducer 194. This may indicate that there is a loose hose connection leading from the valve V1 to the inlet section 28. Also, if the liquid level in the tank 14 is rising above the predetermined upper limit, this may also indicate a malfunction in the system in that it is failing to deliver pressurized air to block flow through the inlet section 28.

As a further example, let's assume that the recirculating system 36 is operating, and that the liquid level in the tank 36 has dropped two inches during the recirculating stage (which is the level drop at which the recirculating stage is to stop), but that the pressure transducer 196 indicates that the liquid level in the tank 14 is going yet lower. This may well indicate that the valve V5 may be stuck open and is pumping air through the tube 128 to continue recirculation of the liquid in the tank 14 back to the septic tank 12.

As yet another example, let us assume that the liquid level in the second tank 40 is being monitored during the pump out process where the liquid in the tank 40 is being directed through the filters 172 and 56, and also through the ultraviolet heater 58. Let it further be assumed that rate at which the liquid level is dropping to the lower limit in a predetermined time period (e.g. about thirty six minutes or so) is slower then the preset rate. This could indicate that either or both of the filters 172 and 56 is or are clogged to some extent and need maintenance.

Figure 11:
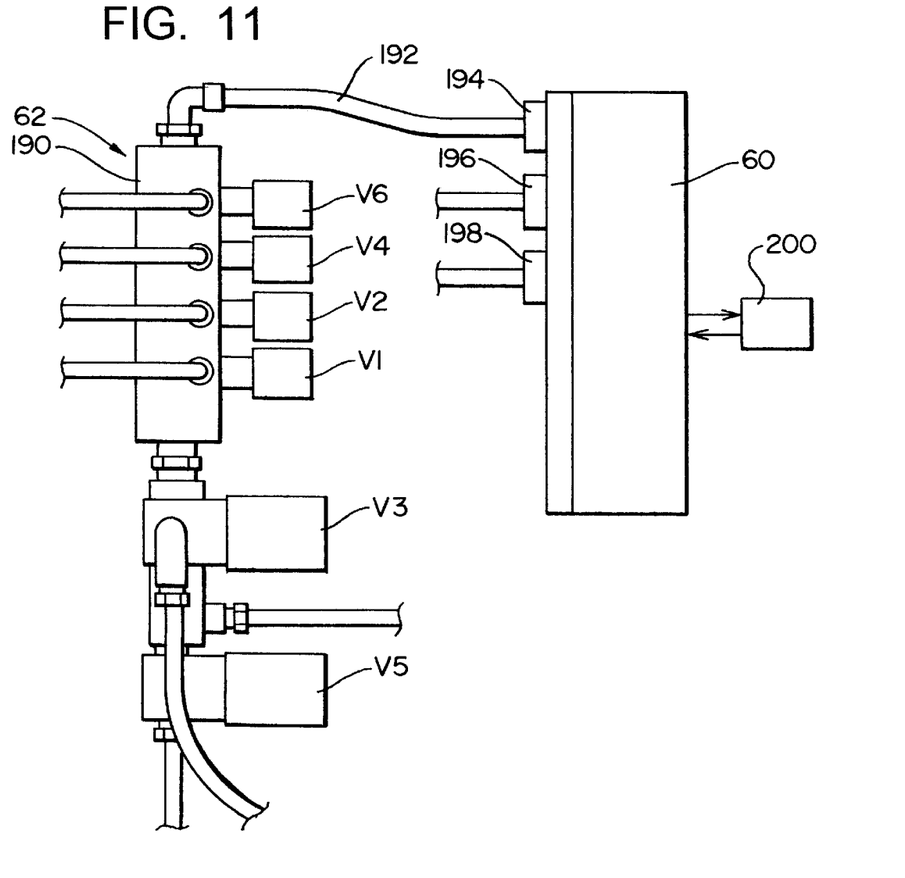
FIG. 11 is a somewhat schematic view of the monitoring system that is incorporated in the control system of the present invention.

With further reference to FIG. 11, an automated telephone apparatus 200 is indicated, with this having a two way communication with the computer 60. When the malfunction is detected, the computer 60 operates the telephone apparatus 200 to deliver the information related to a possible or actual malfunction to a central control station, with the telephone unit also transmitting the particular identification number of this particular system that has been installed. At the central location, this signals an appropriate alarm, so that maintenance personnel may get in contact with the owner of the system. Alternatively, if more immediate steps are required, a communication could be sent back through the telephone apparatus 200 to signal that certain remedial steps should be taken. The message delivered back to the computer 60 could be to deactivate the system. Another potential remedy would be for the system to operate at least the valve V2 to insure that the outlet section 30 is blocked and also to deactivate the pump 162, so that there would be no flow through of sewage.

It will be obvious that various modifications could be made to the present invention without departing from the basic teachings thereof. Also, it is obvious that various components could be substituted for those described herein, performing substantially the same or similar functions, without departing from the basic teaching of the present invention.

What is claimed:

1. A water purification system adapted to purify waste liquid from a waste liquid source, such as a septic tank, said system comprising:

a. a processing tank adapted to receive effluent from a said source;

b. an inlet means defining an inlet passageway to receive effluent to be treated, and comprising an inlet pressurized air operated valve means to block and open said passageway to control the flow of effluent through said passageway;

c. an outlet means defining an outlet air passageway and comprising an outlet pressurized air operated valve means to block and open said outlet air passageway to control outflow through said flow air passageway;

d. an aerating means having an inlet to receive pressurized air and to discharge said air through air dispensing means in said tank to aerate effluent in the tank;

e. a dosing means arranged to discharge a quantity of dosing liquid into said tank, said dosing means comprising a pressurized air actuated dosing mechanism arranged to discharge a predetermined quantity of dosing liquid in response to an inflow of pressurized air into said dosing means;

f. a liquid recirculating means, comprising recirculating tube means positioned in said tank, and a air pump means operatively arranged with said tube means to cause a flow of recirculating fluid through said tube means to said source;

g. a control system comprising;

i. a source of pressurized air;

ii. a valve means comprising a plurality of valves arranged to selectively deliver pressurized air to said inlet section and said outlet section and to selectively vent the pressurized air in said inlet section and outlet section so as to control flow into and out of containing tank to selectively block or permit flow therethrough, to deliver pressurized air to said aerating means selectively to cause operation of said aerating means, to selectively deliver pressurized air to said dosing means to cause operation of said dosing means, and to deliver pressurized air to said recirculating means to cause recirculation of said fluid to said source;

iii. computer means arranged to be responsive to liquid level in said tank so as to control operation of said valve means to permit an inflow of effluent from said effluent source through said inlet section, while blocking outflow through said outflow section, thus filling the tank to a predetermined depth, deliver pressurized air to said aerating means to cause aeration of effluent in said tank, direct a quantity of pressurized air into said dosing means to inject a quantity of dosing liquid into said tank, and to deliver pressurized air to said recirculating means to cause flow of effluent in said tank to the source of the effluent.

2. The apparatus as recited in claim 1, further comprising a secondary processing section comprising a secondary tank adapted to receive fluid from said processing tank, said secondary processing section further comprising a recirculating filter means comprising a pump to circulate fluid in the secondary tank through primary filter means, air valve means having an open position to permit recirculation through the primary filter means, and a closed position to redirect liquid from said pump means to a final filter and purification section which in turn comprises a final filter and a radiation purification device, said secondary processing section further comprising an outlet to discharge fluid from said secondary processing section.

3. The apparatus as recited in claim 1, further comprising a monitoring system which in turn comprises means to sense liquid level in said processing tank and also in said secondary tank, said monitoring system also comprising pressure transducer means to sense air pressure related to pressurized air delivered to said valve means, said monitoring means being arranged with said computer means to ascertain operating conditions of said system by monitoring liquid level in the processing tank and the secondary tank, along with air pressure of the valve means, and relating this to processing steps occurring in operation of the apparatus to compare pressure and liquid level conditions expected at certain operating stages with actual liquid level and pressure as a means of detecting a malfunction.

4. A method of purifying waste liquid from a waste liquid source, such as a septic tank, said method comprising:

a. providing a processing tank adapted to receive effluent from said source;

b. directing waste water into an inlet means defining an inlet passageway by venting pressurized air in pressurized air valve means to open said passageway to allow the flow of effluent through said passageway;

c. blocking an outlet air passageway of said tank by directing prssurized air into pressurized air operated outlet valve means to block said outlet air passageway;

d. directing pressurized air into an aerating means to discharge said air through air dispensing means in said tank to aerate effluent in the tank;

e. operating a dosing means to discharge a quantity of dosing liquid into said tank, by directing pressurized air to a pressurized air actuated dosing mechanism arranged to discharge a predetermined quantity of dosing liquid in response to an inflow of pressurized air into said dosing means;

f. operating a liquid recirculating means, to direct pressurized air to recirculating tube means positioned in said tank to cause a flow of recirculating fluid through said tube means to said source;

g. operating a control system to provide a source of pressurized air, and operating a valve means comprising a plurality of valves to accomplish the following:
  i. to selectively deliver pressurized air to said inlet section and said outlet section and to selectively vent the pressurized air in said inlet section and outlet section so as to control flow into and out of containing tank to selectively block or permit flow therethrough;
  ii. to deliver pressurized air to said aerating means selectively to cause operation of said aerating means;
  iii. to selectively deliver pressurized air to said dosing means to cause operation of said dosing means; and
  iv. to deliver pressurized air to said recirculating means to cause recirculation of said fluid to said source.

\* \* \* \* \*